United States Patent [19]
Martin

[11] 3,930,819
[45] Jan. 6, 1976

[54] PRESS MOLDED HOT GLASSWARE HANDLING APPARATUS
[75] Inventor: John Martin, Monterrey, Mexico
[73] Assignee: Fabrication de Maquinas, S.A., Monterrey, Mexico
[22] Filed: Feb. 6, 1975
[21] Appl. No.: 547,604

[52] U.S. Cl. .................... 65/25 R; 65/81; 65/84; 65/169; 65/182 A; 65/260; 65/348
[51] Int. Cl.² ............... C03B 39/00; C03B 9/14; C03B 18/00; C03B 27/00
[58] Field of Search ............. 65/260, 25 R, 162, 84, 65/348, 81, 169, 182 A

[56] References Cited
UNITED STATES PATENTS

| | | | |
|---|---|---|---|
| 1,478,126 | 12/1923 | Lewis et al. | 65/260 |
| 3,167,814 | 2/1965 | Corbett | 65/348 X |
| 3,205,057 | 9/1965 | Benard et al. | 65/260 X |
| 3,328,148 | 6/1967 | Belentepe et al. | 65/348 X |
| 3,361,551 | 1/1968 | Reynolds | 65/25 R |
| 3,372,017 | 3/1968 | Pitbladdo | 65/162 |

Primary Examiner—S. Leon Bashore
Assistant Examiner—Frank W. Miga
Attorney, Agent, or Firm—Kemon, Palmer & Estabrook

[57] ABSTRACT

In a conjunction with a glassware press-molding machine, an arrangement of Bernoulli nozzles is employed to remove the articles from the mold, complete the forming of the articles, cool them, heat treat them and transfer them to a conveyor. The cooling and heat treating is effected by air from the nozzle combined with an airflow directed onto the underside of the articles while supported by the Bernoulli nozzles.

6 Claims, 6 Drawing Figures

PRESS MOLDED HOT GLASSWARE HANDLING APPARATUS

BACKGROUND OF THE INVENTION

Glassware press-molding machines for manufacturing for example, dinner plates, cups, tumblers, glass-brick halves and the like are quite well known. Conventionally these machines employ a two-part lower mold, the central portion of which is movable to elevate the pressed article above the surface of the outer portion of the mold to permit it to be grasped by some sort of handling means for transfer to a conveyor for heat treating, decorating, glazing or other operations. The usual mechanism for taking the pressed ware out of the molds employs radial tongs in which the two tong halves, 180° apart, support the ware along sectors of approximately 30° each. Such tongs must be accurately centered and properly operated to avoid injury of the ware and further, the ware must be cooled while in the mold to a point where it is completely self supporting as otherwise, it would sag once engaged by the tongs.

Due to highly concentrated and therefore uneven heat transfer at localized contacts between the tong lifts and the surface of the ware, the ware is prone to develop what is known in the art as "cold checks." These are small star-like surface cracks which can later function as a starting point for catastrophic failure of the entire article. Prior art attempts to reduce these cold checks include forming the tong jaws of hard asbestos or covering the jaws with a rope made of asbestos or glass wool. This produces improved results but fails to eliminate the problem completely.

Another approach to the problem has been the use of vacuum cups made of porous metal plates or screens. Some of these have been covered with an asbestos or glass fabric to reduce metal contact and consequently avoid cold checks. The problem here has been that the suction cups have to have a very precise contour which matches the ware as atmospheric pressure will deform the ware to the shape of the vacumm cup unless the ware is cool enough to be self supporting. Another problem with this approach is the localized cooling which results in areas of mismatch between the surface of the ware and the surface of the suction cup which concentrates a stream of cold atmospheric air at this location producing undesirable strains in the ware and tending also to produce catastrophic failure. From the foregoing, it will be apparent that the speed of operation of glass press-molding machines is necessarily limited by the time required to cool the ware and the molds until the ware is sufficiently self supporting to permit safe handling with the mechanical contact means now employed.

BRIEF SUMMARY OF THE INVENTION

The above noted problems of handling hot freshly press-molded glass ware are solved by the present invention through the use of a series of movably arranged Bernoulli nozzles. These are mounted with respect to the press molding machine so that once the press member has been retracted to expose the upper surface of the ware, one of the Bernoulli nozzles can be aligned with and placed in close but non-contacting relation with the ware. The flow of air along the under surface of the nozzle member is effective, upon vertical elevation of the nozzle, to remove the ware from the mold and suspend it in closely spaced but non-contacting relation with respect to the nozzle. The body of the nozzle is such that the under surface which faces the ware to be handled has a configuration which matches the upper surface of the ware. The nozzle can then be rotatably indexed about a supporting structure to move the ware over a conveyor which will transport it to a remote location for other operations. During a part of the aforesaid indexing movement, a flow of air is also directed along the underside of the ware and the net result of these two air flows is that the ware is cooled simultaneously and heat treated. In addition, it does not matter whether the ware is sufficiently cooled before removal from the mold to be self supporting because it will actually conform to the configuration of the nozzle member if it is still at that high a temperature.

DETAILED DESCRIPTION OF THE DRAWINGS

Figure 1:
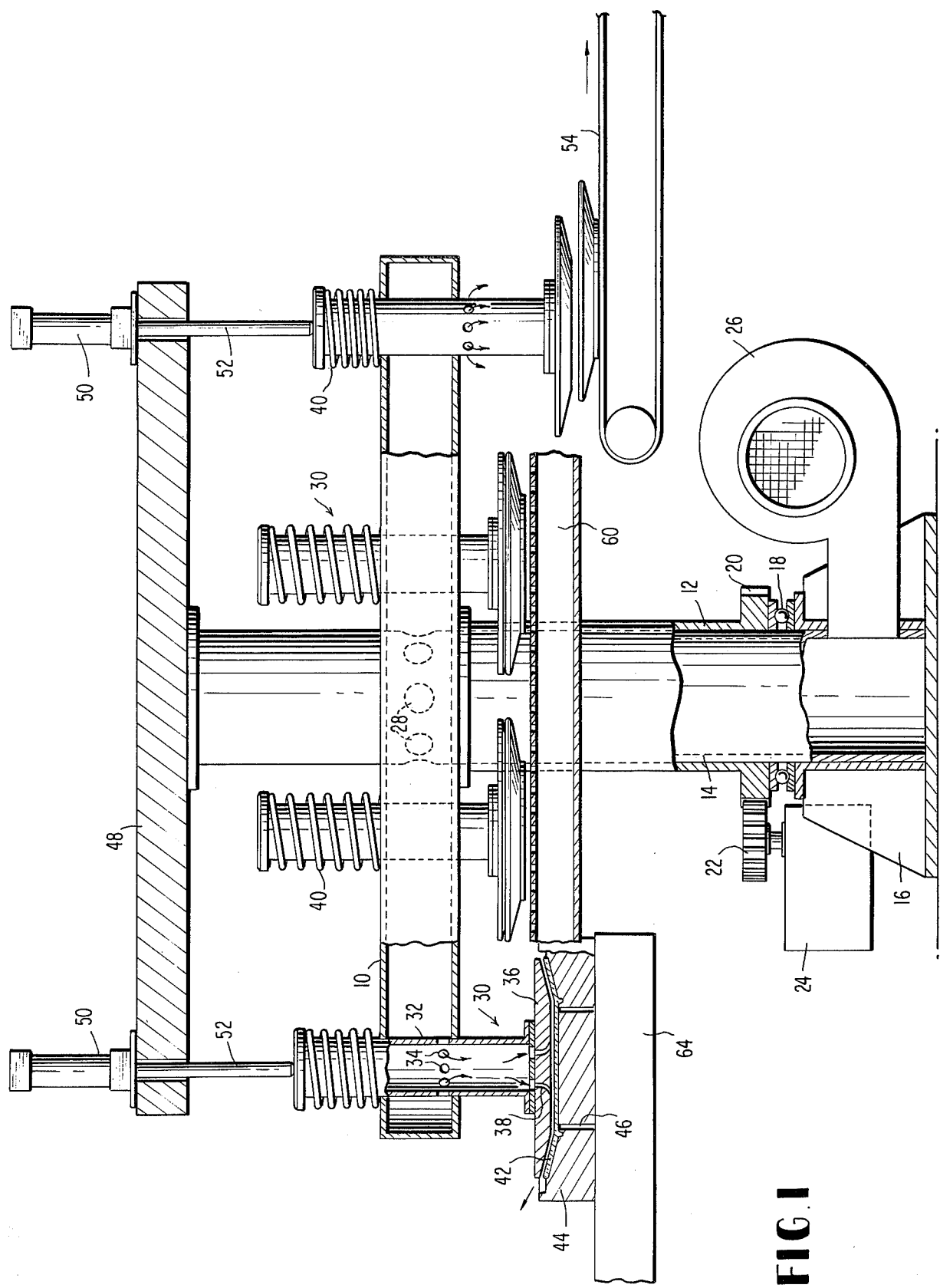
FIG. 1 is a side elevation partially in section of a preferred embodiment of the present invention.

Referring first to FIG. 1 of the drawings, a manifold 10 in the form of a hollow torus is supported on a sleeve 12 for rotation around a hollow column 14 which in turn is supported on a base member 16. A thrust bearing 18 sustains the vertical load and reduces the power necessary to rotate the manifold assembly about the column 14. A ring gear 20 on the lower end of the sleeve 12 engages with the pinion 22 which is driven by a suitable indexing mechanism schematically indicated at 24. Air under pressure is forced into the lower end of the sleeve 14 by means of a blower indicated at 26 in order to maintain a positive air pressure within the manifold 10 which communicates with the sleeve 14 through the openings 28.

A plurality of Bernoulli nozzle member assemblies 30 are mounted for vertical sliding movement within the manifold 10. Each nozzle assembly 30 includes a sleeve 32 having a series of openings 34 which are normally in fluid communication with the interior of the manifold 10. The actual Bernoulli nozzle members 36 are supported at the lower end of the sleeve 32 and each includes fluid passageways 38 which establish fluid communication between the interior of the sleeves 32 and the under surface of the nozzle member 36.

Each of the nozzle assemblies is normally biased by means of springs 40 to the position of those assemblies which in FIG. 1 lie closest to the column 14. In this position, the interior of the sleeves 32 is in full fluid communication with the interior of manifold 10 and thus air under pressure is constantly flowing outwardly and along the under surfaces of the nozzle members 36.

As shown in the left hand portion of FIG. 1, a piece of freshly molded glassware 42 is shown lying in the mold 44, the press member (not shown) having been moved out of the way. It should be noted at this point that the mold 44 may be a one piece mold because the ware will be removed from the mold by means of the Bernoulli nozzles. This avoids having to utilize the two piece molds of the prior art which require a vertically reciprocating ram to lift the ware into a position to be grasped by tongs or the like. Preferably, however, there are fluid passageways 46 which extend completely through the mold and which may be almost capillary in size to act as vacuum breakers as the ware is lifted vertically upwardly from the mold by the nozzle members.

Also supported on the column 14 is a yoke member 48 supporting a pair of cylinders 50 and for operating push rods 52 which engage the upper closed ends of the sleeves 32 at appropriately indexed positions of the manifold 10 to effect removal of the ware from the mold and subsequent transfer of the ware from the nozzle member to a takeoff conveyor 54.

Figure 2:
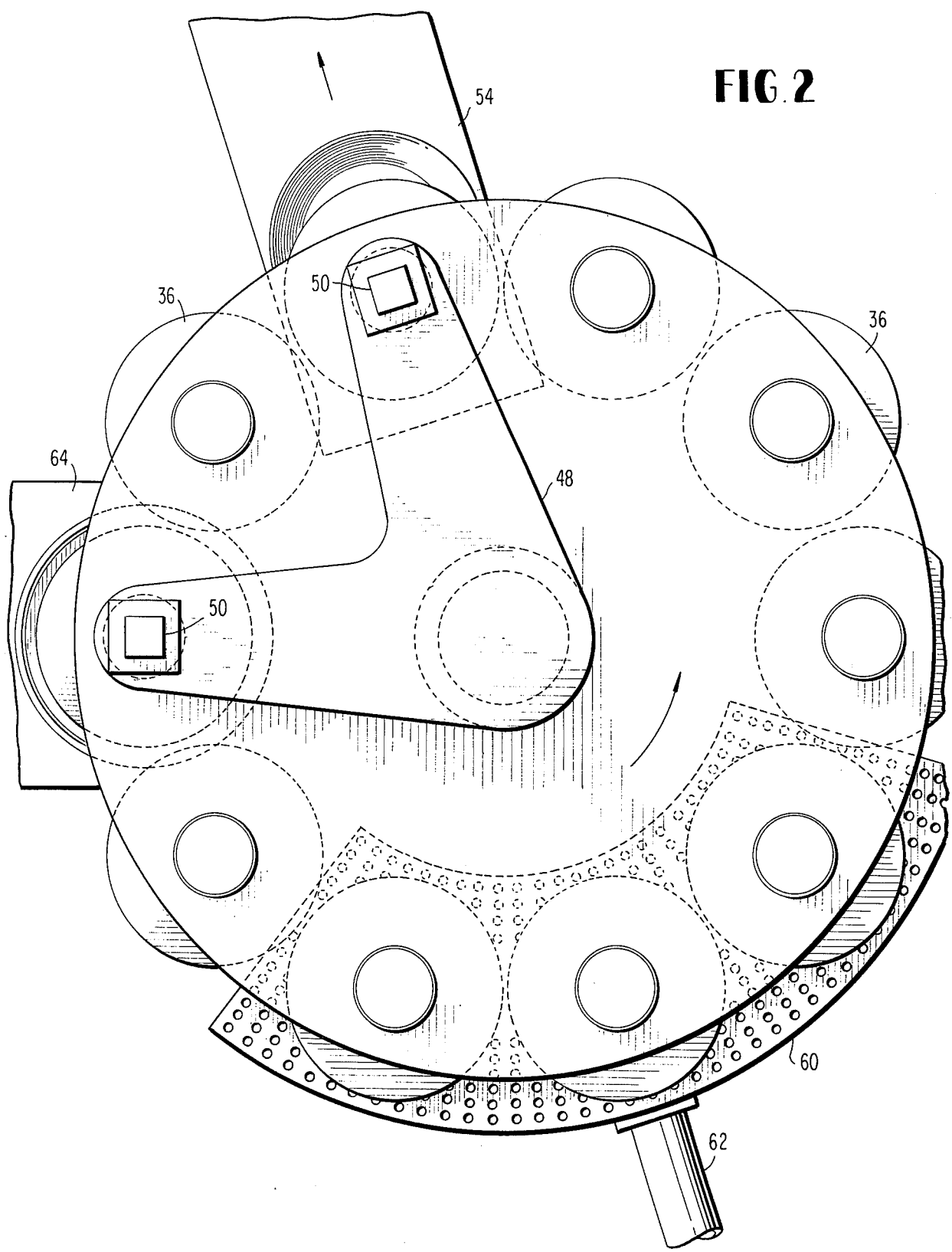
FIG. 2 is a top plan view of the apparatus shown in FIG. 1.
Figure 3:
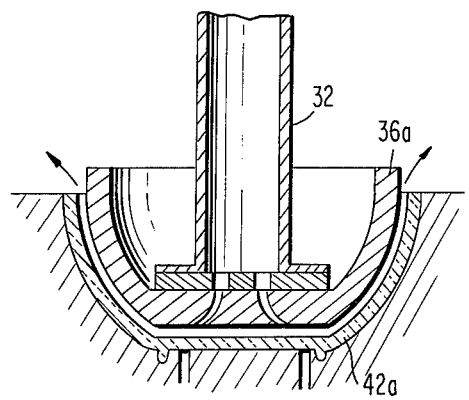
FIGS. 3, 4, 5 and 6 are each sectional views showing different forms of glassware and the corresponding nozzle shapes for handling such ware.

Referring now to FIG. 2 of the drawings, it will be seen that the actual position of the takeoff conveyor 54 is at about 11 o'clock rather than as indicated in FIG. 1. This is to permit adequate time following removal of the ware from the mold to permit completion of forming, cooling and heat treating the ware prior to depositing on the takeoff conveyor. To assist in the cooling and heat treating operations, a second segment shaped manifold 60 is positioned beneath the manifold 10 as appears most clearly in FIG. 2. Substantially the entire upper surface of the manifold 60 is perforated so as to direct air upwardly along the undersurface of the ware supported by the nozzle assemblies as the manifold 10 is indexed between the starting and discharge positions. The manifold 60 may be fed with air under pressure by any convenient means indicated schematically by a pipe 62 in FIG. 2.

Referring again to FIG. 1, the mold 44 may be supported on a base 64 which is indexable between the position shown in FIGS. 1 and 2 and another position underlying the ram of the press (not shown).

OPERATION

Assuming therefore that the molding machine has completed a cycle to form, for example, a dinner plate 42 in the mold 44, the mold support 64 is then indexed to the position shown in FIGS. 1 and 2. The cylinder 50 is then actuated to depress the nozzle assembly to the position shown in the left hand side of FIG. 1 so that the nozzle member 36 closely overlies the plate 42 but is maintained in non-contacting spaced relation therefrom. Since air under pressure from the blower 26 is flowing through the passageways 38 in the nozzle 36 and along the under surfaces of the nozzle, the reduction in pressure between the nozzle 36 and the plate 42 is effective when the rod 52 is withdrawn permitting elevation of the sleeve 32, to remove the plate from the mold and support it in spaced but non-contacting relation. The manifold 10 is then indexed around through the various positions indicated in FIG. 2 and as will be noted the plate during three of these positions will overlie the manifold 60 so that air will be directed along both the upper and lower surfaces of the ware to complete the cooling and heat treating steps. When each nozzle assembly approaches the 11 o'clock position of FIG. 2, the cylinder 50 at that location is actuated as indicated in the right hand portion of FIG. 1 to position the sleeve 32 so that its openings 34 are outside of the manifold 10. This of course cuts off the flow of air to the nozzle 36 and therefore permits the ware to fall by gravity onto the takeoff conveyor 54.

One of the outstanding advantages of the present invention is that the ware at the time that it is removed from the mold need not be cool enough to be self supporting. Since the nozzle members do not actually contact the ware but are nevertheless shaped to conform to the desired upper surface of the ware the differential in pressure between the under and upper sides of the ware is effective to actually complete the forming operation while simultaneously cooling and heat treating the ware. Obviously, this results in a greatly increased speed of operation because it eliminates completely the need for first cooling the ware in the mold to a point where it is self supporting. The fact that by the same apparatus, the necessary cooling and heat treating steps are simultaneously performed further increases the speed of production of press molded ware.

Figure 4:
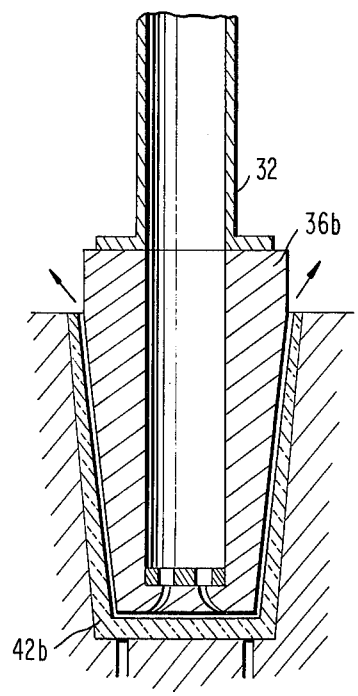
Figure 5:
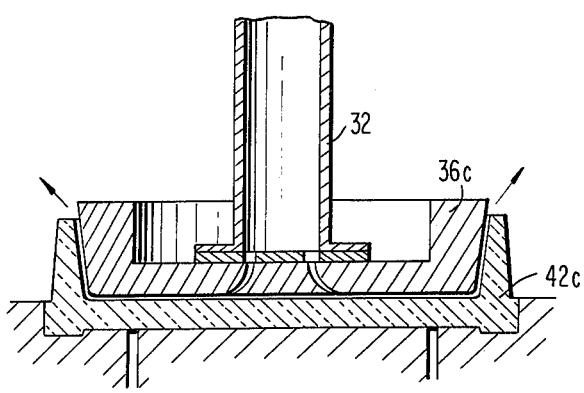
Figure 6:
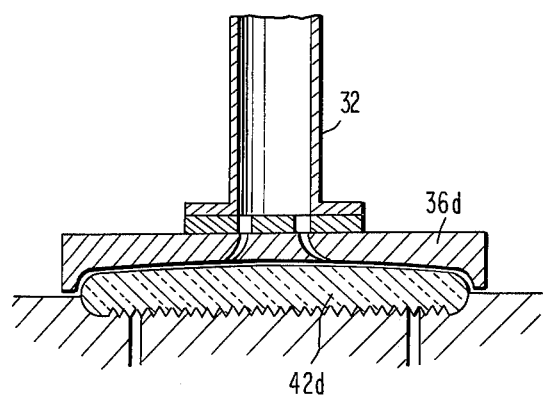

Referring lastly to FIGS. 3, 4, 5 and 6, these figures merely illustrate different types and shapes of press molded ware which can be handled in accordance with the teaching of the present invention so long as the actual nozzle has a configuration conforming to the uppersurface of the ware. Thus in FIG. 3, a cup shaped ware 42A is shown in the mold with a correspondingly shaped nozzle 36A positioned to remove the ware from the mold. In FIG. 4, the ware 42B is cup shaped and the nozzle 36B is shaped accordingly. In FIG. 5, the ware 42C is one half of a hollow glass brick with a correspondingly shaped nozzle 36C. In FIG. 6, the ware 42B is a reflector button 42D for laying on pavement or the like and the nozzle 36D has an under surface configuration conforming to the upper surface of the button.

From the foregoing it will be apparent to those skilled in the glass making art that there is herein shown and disclosed a new and useful apparatus for handling of freshly press-molded ware. While preferred embodiments have been herein shown and disclosed, applicant claims the benefit of a full range of equivalents within the scope of the appended claims.

I claim:

1. A method of removing freshly molded glass articles such as plates, cups, tumblers and the like from the mold in which they were formed, said mold having means communicating atmospheric pressure to the underside of the molded article, the steps comprising:

removing the press member from the mold to expose the upper surface of the molded article while still in the mold:

positioning a Bernoulli nozzle member having a surface of the same configuration as the upper surface of the molded article in vertically closely spaced non-contacting alignment therewith, said nozzle member having fluid passageways extending therethrough and opening substantially tangentially into said surface;

forcing air under pressure through said fluid passageways along said nozzle surface to create a thin film of high velocity air at less than atmospheric pressure between said surface and the upper surface of said molded article;

elevating said nozzle member to remove the article from the mold while maintaining closely spaced non-contacting relation between the nozzle and the article; and directing a flow of air onto the underside of the article while supported by said nozzle; whereby said article is simultaneously formed, heat treated and cooled without the necessity of mechanical contact therewith.

2. The method defined by claim 1 including the additional steps of moving said nozzle and article horizontally away from the mold, then out of the path of air flow on the underside of the article, and then over a conveying means and finally stopping the flow of air to said nozzle to deposit the article on said conveying means.

3. The method defined by claim 1 in which said article is removed from its mold while still too hot to be self supporting.

4. A method defined by claim 2 including continuously repeating all said steps in timed relation to the operation of an associated molding apparatus.

5. Apparatus for removing freshly pressed glassware from a mold while still too hot to be self supporting said mold having means communicating atmospheric pressure to the underside of the molded article comprising:

a Bernoulli nozzle member having a surface of substantially the same size and shape as the upper surface of the glass ware, said nozzle member including a plurality of passageways therethrough terminating in openings directed substantially tangentially to said surface;

means for forcing air under positive pressure through said passageways to create a moving film of air along said surface;

means for supporting said member so that said surface is in closely spaced alignment with the glassware to be removed from its mold;

means for elevating said member together with the glassware to remove it from the mold; and means for moving said support means in a plane parallel to the plane of the mold to permit a succession of molding and removal steps.

6. Apparatus as defined by claim 5 in which said support means includes a manifold supporting a plurality of nozzle members in a circular array and means for indexing said support means in circular fashion to align successive nozzle members with the mold.

* * * * *